United States Patent Office
3,410,372
Patented Nov. 12, 1968

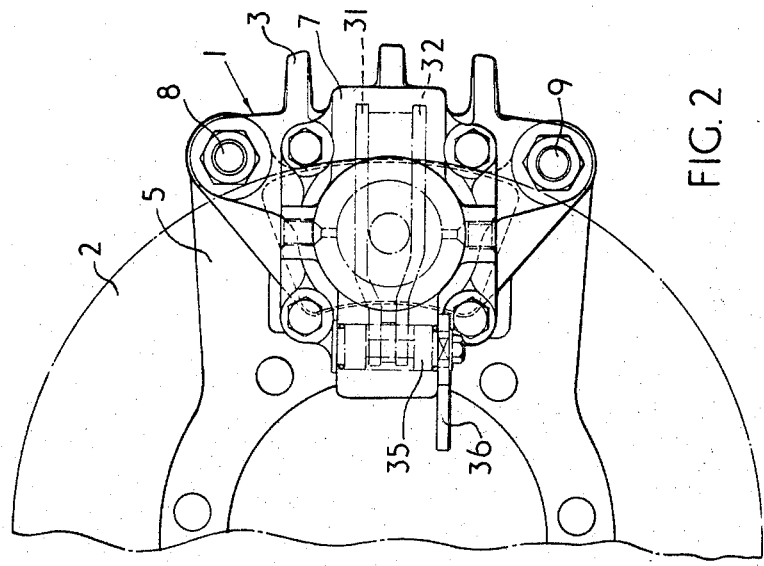
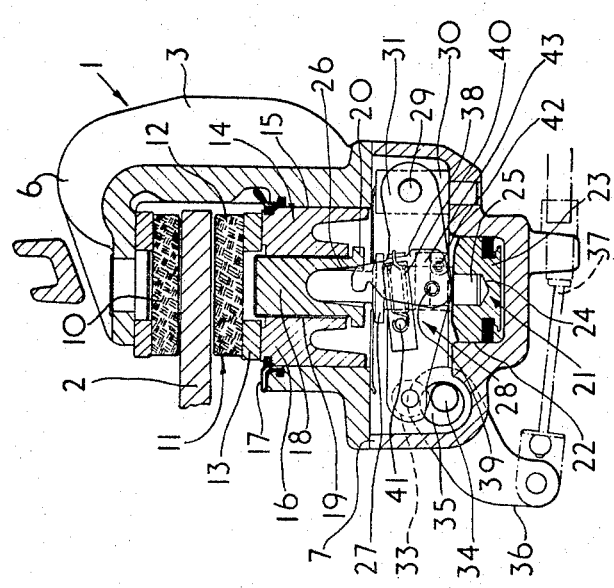

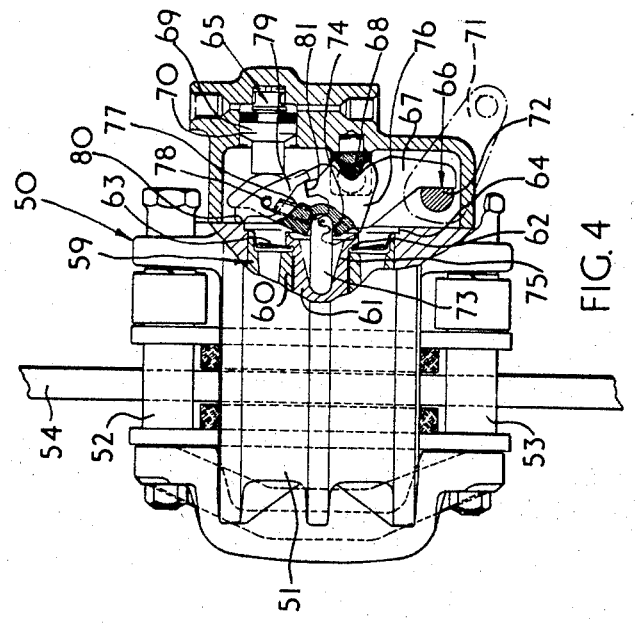
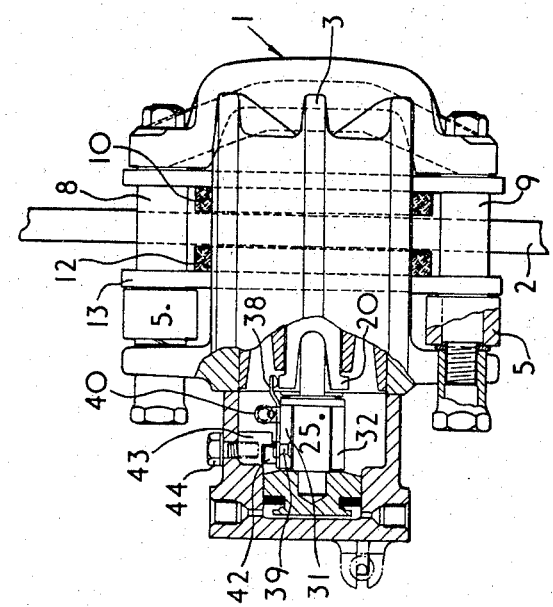

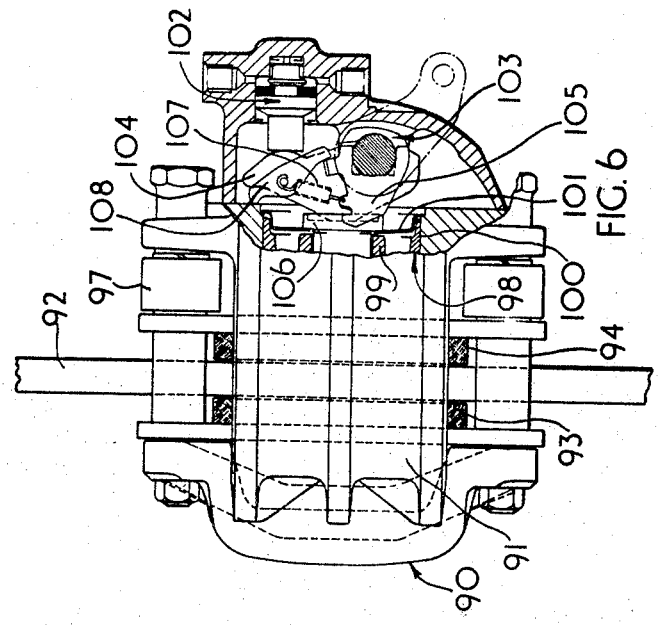
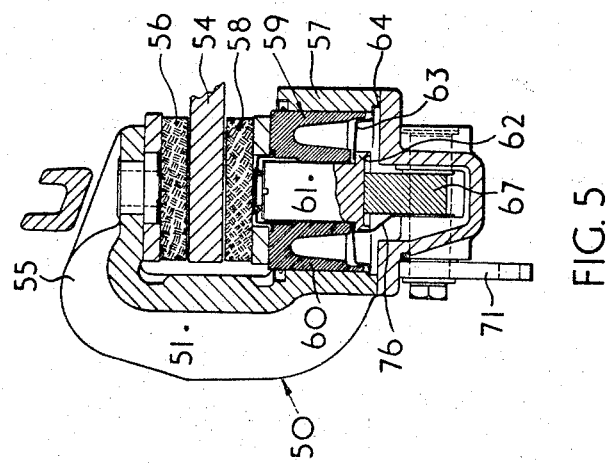

3,410,372
SUPPORT MEANS AND ADJUSTING MEANS FOR A DISC BRAKE
Harold Hodkinson, Finham, and Anthony Colin Evans, Binley, England, assignors to Dunlop Rubber Company Limited, London, England, a corporation of Great Britain
Continuation of application Ser. No. 516,187, Nov. 10, 1965. This application Jan. 11, 1968, Ser. No. 697,240
Claims priority, application Great Britain, Nov. 19, 1964, 47,057/64
16 Claims. (Cl. 188—73)

ABSTRACT OF THE DISCLOSURE

This invention comprises inter alia, a disc brake having a combination of mechanical and hydraulic brake applying mechanisms which are operable independently of each other so that the brake can be either mechanically or hydraulicially operated. An adjustably elongated member forms part of the thrust connection between the friction element and both the hydraulic and mechanical applying mechanisms, to compensate for wear of the friction member which occurs during braking.

---

This invention relates to disc brakes, and this application is a continuation in whole of application Ser. No. 516,187, filed Nov. 10, 1965, now abandoned, for "Disc Brakes."

One object of the invention is to provide a disc brake which is operable both by a hydraulic brake-applying mechanism, and a mechanical brake-applying mechanism, and which is therefore suitable for use where operation by a hydraulic foot brake mechanism and also by a mechanical hand brake mechanism is required.

According to the invention a disc brake comprises a rotatable disc, a nonrotatable support, a rigid caliper mounted on the support and restrained from rotational movement about the axis of the disc and having a pair of limbs straddling a periphery of the disc, a pair of friction elements associated one with each limb of the caliper so as to be engageable with the sides of the disc, and a brake-applying mechanism for pressing at least one of the friction elements towards the disc, the brake-applying mechanism comprising a thrust member mounted in the associated limb of the caliper and guided for axial movement relative to the caliper to apply a thrust to the associated friction element, a thrust device, and a lever mechanism arranged to transmit the thrust from the thrust device to the thrust member, the thrust member being adjustable in length and means associated with the lever mechanism being provided to effect automatic adjustment of the length of the thrust member to take up clearances arising from wear of the friction elements.

According to one aspect of the invention, a hydraulically-operated thrust device and a mechanically-operated thrust device are provided, and means associated with the lever mechanism is provided for effecting automatic adjustment of the length of the thrust member to take up clearances arising from wear of the friction elements.

The thrust member may comprise a pair of screw-threadedly engaged portions which are rotatable relative to one another by a ratchet device operable whenever the movement of the lever to apply the brake exceeds a predetermined amount, the arrangement being such that relative rotation of the portions of the thrust member takes place on release of the brake.

Three embodiments of the invention will now be described, by way of example, with reference to the accompanying drawings, in which:

FIGURE 1 is an axial cross-sectional view of a disc brake;
FIGURE 2 is an end view of the brake shown in FIGURE 1;
FIGURE 3 is a partly cross-sectional radial view of the brake shown in FIGURES 1 and 2;
FIGURE 4 is a partly cross-sectional radial view of an alternative disc brake according to the invention;
FIGURE 5 is an axial cross-sectional view of the brake shown in FIGURE 4;
FIGURE 6 is a partly cross-sectional radial view of a further alternative disc brake according to the invention.

A single-sided disc brake 1 (see FIGURES 1-3) for use on the rear wheels of a motor vehicle comprises a disc 2 mounted for rotation with a wheel, and a nonrotatable caliper 3 mounted on a nonrotatable anchoring and locating component 5 at one side of the disc 2 and having a pair of limbs 6 and 7 straddling the outer periphery of the disc 2. The caliper 3 is slidably mounted so as to be movable in the axial direction of the disc on a pair of pins 8 and 9 as described in the specification of our co-pending U.S. patent application No. 506,151, now abandoned.

The limb 6 of the caliper 3 carries a friction element 10 fixed to the limb, and the other limb 7 carries a friction element 11 which is movable axially relative to the caliper, the movable friction element 11 consisting of a friction pad 12 mounted on a backing plate 13 which is engaged by one end of a thrust member 14 slidably mounted in a bore 15 of the caliper.

The thrust member comprises an outer portion 16 in the form of a piston slidable in the bore 15 and provided with a rubber seal 17 to exclude moisture and dirt from the interior of the bore, and an inner portion 18 in the form of a screw engaging a screw-threaded axial bore 19 in the piston portion 16. The portion 16 is nonrotatably secured to the backing plate 13, and a ratchet 20 is formed on the head of the screwed inner portion 18 to enable the portion 18 to be rotated by means to be described, relatively to the portion 16 to adjust the length of the thrust member.

A hydraulic brake operating mechanism 21 consists of a cylinder 22, formed as a blind bore in the caliper, and a piston 23. The piston 23 is formed with a socket 24 into which one end of a push rod 25 is inserted, the push rod 25 being received at its other end in a socket 26 formed in the inner portion 18 of the trust member to convey the thrust from the hydraulic mechanism 21 to the thrust member.

The push rod 25 is formed with a flange 27 between its ends for engagement by a lever 28 pivotally attached at one end to a pin 29 mounted in a block 30 fixed to the caliper. The lever 28 is formed from two side portions 31 and 32 extending one each side of the push rod 25 and each engaging the flange 27 thereof. The free end of the lever 28 is provided with a roller 33 engageable by a cam 34 which is mounted on a pin 35 rotatably supported in the caliper and provided with an operating lever 36 and a cable 37 for connection to a vehicle hand brake operating means.

The brake 1 can be operated by the hand brake operating mechanism independently of the hydraulic brake operating mechanism 21, the lever 28 being rotatable about its pivot pin 29 by the action of the cam 34 to press on the flange 27 of the push rod 25.

Automatic adjustment of the length of the thrust member 14, to compensate for friction pad wear, is provided by a pawl 38 pivotally mounted on the portion 31 of the lever 28 by means of a pin 39 and engaging the ratchet 20. A pawl spring 40 is secured at one end to the pawl 38 and at the other end to a pin 41 fixed to the lever portion 31, the spring 40 tending to urge the pawl in a counterclockwise direction as seen in FIGURE 1, and thus tending to turn the ratchet 20 in such a direction as to cause the inner portion 18 to be screwed outwardly from the outer portion 16 to increase the length of the thrust member. Movement of the pawl in the inoperative state of the brake is prevented by the engagement of a peg 42 (FIGURE 3), fixed to the pawl, with an abutment 43 fixed to the caliper by a bolt 44.

When the brake is applied, either by the hydraulic mechanism or by the mechanical brake-applying mechanism, the lever 28 is tilted towards the disc about its pivot pin 29. The peg 42 is prevendted by the abutment 43 from moving towards the disc and the pawl 38 is thus moved in a clockwise direction about its pivot pin 39 against the opposition of the spring 40. If the brake clearance is such that the movement of the lever required to apply the brake exceeds a predetermined value, the pawl will re-position itself behind a fresh tooth on the ratchet and on release of the brake will be drawn by back by the spring 40 to rotate the inner portion 18 of the thrust member so as to increase the effective length of the thrust member.

FIGURES 4 and 5 show a disc brake 50 which is similar in its general construction to that shown in FIGURES 1–3 but which incorporates an alternative brake operating mechanism.

The disc brake 50 comprises a caliper 51 of a similar kind, and axially slidably supported, in a similar manner to that shown in FIGURES 1–3, on pins 52 and 53 attached to a nonrotatable support and extending axially adjacent the outer periphery of a disc 54. One limb 55 of the caliper 51 has a friction element 56 fixed thereto, and the other limb 57 has a friction element 58 associated therewith and movable axially towards the disc. A thrust member 59 is slidably mounted in the limb 57 of the caliper, and is of a similar kind to that of the brake shown in FIGURES 1–3, comprising an outer screw-threaded portion 60 and an inner screw-threaded portion 61. The inner portion 61 has a head 62 formed as a ratchet, as in the embodiment described above. An annular sheet-metal retraction spring 63 is engaged at its inner edge beneath the head 62 and is supported at its outer edge in a recess 64 formed in the caliper.

The brake 50 is provided with a hydraulic operating mechanism 65 and a mechanical operating mechanism 66 acting at opposite ends of a lever 67 which is pivotally supported between its ends on a fulcrum 68 secured to the caliper. The hydraulic mechanism 65 comprises a guided piston 69 slidable in a bore 70 of the caliper, and the mechanical operating mechanism 66 comprises an operating lever 71 for connection to a hand brake operating mechanism and a cam 72 rotatable by the lever 71 to move the lever 67 in the counterclockwise direction as seen in FIGURE 4. Counterclockwise movement of the lever 67 can thus be effected by either of the mechanisms 65 and 66, and such movement of the lever 67 develops a brake-applying thrust which is conveyed to the thrust member 59 by a push rod 73 received in sockets 74 and 75 formed respectively in the lever 67 and the inner portion 61 of the thrust member 59.

A pawl 76 is pivotally mounted in the caliper about an axis passing through the lever fulcrum 68 and is engaged with the ratchet 62. A pawl spring 77 is secured at one end to the pawl 76 and at the other end to a pin 78 which is secured to the lever 67 and which forms a pivot for a second lever 79. One end of the lever 79 engages an abutment 80 on the caliper and the other end engages a lug 81 formed on the pawl 76.

In operation, counterclockwise movement of the lever 67 presses the push rod 73, thrust member 59 and friction element 58 towards the disc, the body of the caliper moving axially under the reaction force set up when the friction element 58 contacts the disc to bring the other friction element 56 into engagement with the opposite side of the disc. The second lever 79 is rotated, during brake application, in a clockwise direction as seen in FIGURE 4, causing a corresponding counterclockwise movement of the pawl 76. It will be noted that the effect of the lever 79 is to provide an increased angular movement of the pawl 76 compared with that which would be obtained if it were rotated by engagement of a fixed abutment on the caliper with the lug 81.

When the movement of the lever 67 to apply the brake exceeds a predetermined amount, the pawl 76 is repositioned behind a fresh tooth on the ratchet 62, and on release of the brake is drawn back by the spring 77 to rotate the ratchet so as to increase the effective length of the thrust member, as in the embodiment described above. The retraction spring 63 is deformed resiliently on application of the brake and draws the thrust member back when the brake is released, thus returning the lever 67 to its original position. The spring 77 also tends to return the lever 67 to its initial position, the tension of the spring tending to rotate the pawl 76 and thus the second lever 79 in a direction to urge the lever 76 in a clockwise direction as seen in FIGURE 4.

FIGURE 6 shows a disc brake 90 of similar general construction to the brakes described above but incorporating a further alternative operating mechanism. The brake 90 comprises a caliper 91, disc 92, and friction elements 93 and 94, the caliper 91 being axially slidably supported on pins 95 and 96 secured to a nonrotatable support 97. A thrust member 98 is axially slidably supported in the caliper and comprises inner and outer screw-threadedly engaging portions 99 and 100 respectively. An annular retraction spring 101 is provided as in the embodiment shown in FIGURES 4 and 5.

The brake 90 is provided with a hydraulic operating mechanism 102 and a mechanical operating mechanism 103 which, as in the previously described embodiment, act at opposite ends of a lever 104. The lever 104, is, however, not pivotally supported on a fulcrum attached to the caliper: the mechanism 103 provides a fulcrum for the lever when the brake is operated by the mechanism 102 and the mechanism 102 provides the fulcrum when the mechanism 103 is operated. The lever 104 engages the thrust member 98 at a point between its ends to transmit the brake operating thrust to the thrust member.

An automatic adjustment mechanism constructed similarly to that shown in FIGURES 4 and 5 is provided to compensate for friction pad wear. The adjustment mechanism comprises a pawl 105, a ratchet 106, a pawl spring 107, and a second lever 108 arranged to operate in a similar manner to the adjustment mechanism of the brake shown in FIGURES 4 and 5.

What is claimed is:

1. In a disc brake having a rotatable disc, the structure comprising a nonrotatable support, a rigid caliper mounted on said support and restrained from rotational movement about the axis of the disc and having a pair of limbs straddling the periphery of said disc, a pair of friction elements associated one with each limb of the caliper so as to be engageable with the sides of the disc, and a brake-applying mechanism for directly pressing at least one of the friction elements towards the disc, said brake-applying mechanism being mounted on the caliper and comprising a thrust-member mounted in the associated limb of the caliper to apply a thrust to the associated friction element, a fluid pressure operated thrust device aligned with the thrust member and actinng through said thrust member to apply the associated friction element, a lever pivotally attached at one end to said caliper and also attached to said thrust member to be movable by said fluid pressure operated thrust device, a mechanical brake operating mechanism associated with the other end of the lever, said lever having a force transmitting connection with said thrust member to transmit the thrust from the mechanical brake operating mechanism to the thrust member independently of said fluid pressure operated thrust device, the thrust member being adjustable in length and comprising an outer cylindrical member nonrotatably secured to the associated friction element and slidably engaging the walls of an axially formed bore in said caliper, the outer cylindrical member being held by the bore against transverse movement relative to the axis of the disc, and an inner rotatable member in screw-threaded engagement with the outer member, and adjustment means associated with the lever to effect automatic adjustment of the length of the thrust member by rotation of the inner member thereof.

2. A disc brake structure in accordance with claim 1 wherein said thrust member includes an abutment connection with said operating lever which is bifurcated to impart a balanced thrust force thereon, said thrust member including a flanged push rod providing an articulated connection between said thrust member and said fluid pressure operated thrust device.

3. The disc brake structure in accordance with claim 2 including a pawl operatively carried by said lever and engageable with a coacting portion of said rotatable member to effect rotation of said inner member whereby said adjustment means is effective to control of the length of said thrust member.

4. The disc brake structure in accordance with claim 1 wherein said outer cylindrical member is in direct thrust engagement with one of said friction elements and is responsive to both said mechanical and said hydraulic operating mechanisms.

5. In a disc brake including a rotatable disc, the structure comprising a nonrotatable supporting frame work comprising a substantially flat support member having two radially extending outwardly projecting limbs forming a notch therebetween disposed alongside said brake disc adjacent one of the radially extending side faces thereof, a pair of axially fixed anchoring-and-locating members one on each of said limbs which are angularly spaced apart and extending axially to provide torque-taking surfaces located along one side only of said disc and disposed closely adjacent thereto, a pair of friction elements having means providing slidable support relatively to said anchoring-and-locating members and disposed one on each side of said disc to be engageable with opposite braking surfaces of said disc, one of said friction elements consisting of an elongated friction liner and backing having slidable torque-taking remote ends adapted to operatively transmit anchoring thrust to said support member through angularly spaced complementary locations disposed closely adjacent said disc and located adjacent said pair of combination anchoring-and-locating members, a rigid caliper carried by said anchoring-and-locating members and proportioned to be positioned between the said anchoring-and-locating members and having surfaces adapted to be complementary with said torque-taking surfaces and slidably supported thereon at one side of said rotatable disc, said caliper having a pair of limbs straddling the said periphery of the disc, a brake applying mechanism supported by one limb of said caliper and arranged to be operated to press the friction element associated therewith toward the disc and the other limb disposed in operative engagement with the other friction element to move it toward the disc under the reaction set up on the caliper by said brake applying mechanism as said other limb is drawn toward said anchoring-and-locating members, and other friction element being disposed between said other limb and the assoicated side of said disc, said caliper being freely movable in an axial direction relative to said anchoring-and-locating members and positively located with respect to the radial and circumferential directions with respect to said friction elements, and a second brake applying mechanism comprising a thrust member mounted in a limb of said caliper and located to apply a thrust to the associated friction element, a lever mechanism arranged to transmit thrust to said thrust member, and mechanically-operable actuating means associated with said lever to effect operation of said second brake applying mechanism.

6. The brake structure in accordance with claim 5 including means associated with said lever mechanism for effecting automatic adjustment of the length of the thrust member to take up clearances arising from wear of the friction elements.

7. A disc brake according to claim 6 wherein the thrust member comprises a pair of parts in screw-threaded engagement with one another and rotatable relatively to one another to adjust the axial length of the thrust member.

8. A disc brake according to claim 7 wherein one of the screw-threaded parts is prevented from rotating and the other part is rotatable and is engageable by the means associated with the lever mechanism to effect automatic adjustment of the length of the thrust member.

9. A disc brake according to claim 8 wherein the thrust member comprises an outer cylindrical part axially slidable in a bore of the caliper and non-rotatably secured to the associated friction element, and an inner part in screw-threaded engagement with the outer part.

10. A disc brake according to claim 8 wherein the rotatable part comprises a ratchet, and a pawl is provided to engage the ratchet to effect said automatic adjustment, the pawl being associated with the lever mechanism.

11. A disc brake according to claim 10 wherein a pawl spring is provided to urge the pawl in a direction which would tend to rotate the ratchet and the rotatable part to increase the length of the thrust member, abutment means being provided to urge the pawl against the spring on application of the brake, the arrangement being such that movement of the lever mechanism beyond a predetermined amount in applying the brake as a result of excessive clearance arising from wear of the friction elements will cause the pawl to engage a fresh tooth on the ratchet and on release of the brake the pawl will be urged by its spring to rotate the ratchet to effect automatic adjustment of the length of the thrust member to take up the clearance.

12. A disc brake according to claim 11 wherein the pawl is pivotally mounted on the lever mechanism so as to be movable in a plane parallel to the plane of the movement of the lever mechanism.

13. A disc brake according to claim 12 wherein the lever mechanism comprises a lever pivotally attached at one end to the caliper and associated with the thrust member at a position between its ends, the pawl being pivotally mounted on the lever and being engageable by an abutment on the caliper to effect the said automatic adjustment of the length of the thrust member.

14. A disc brake according to claim 13 wherein the pawl spring is secured at one end to the pawl and at the other end to the lever.

15. A disc brake according to claim 13 wherein a mechanical brake operating mechanism is provided at the end of the lever remote from its pivot.

16. A disc brake according to claim 15 wherein the mechanical brake operating mechanism comprises a cam mechanism.

References Cited

UNITED STATES PATENTS

| 2,940,554 | 6/1960 | Cameron | 188—96 X |
| 2,966,964 | 1/1961 | Brueder | 188—73 |
| 3,059,731 | 10/1962 | Gancel et al. | 188—73 |
| 3,169,608 | 2/1965 | Press et al | 188—72 |
| 3,211,263 | 10/1965 | Harrison | 188—72 X |
| 3,236,336 | 2/1966 | Harrison | 188—73 |
| 3,269,490 | 8/1966 | Swift | 188—72 |

MILTON BUCHLER, *Primary Examiner.*

G. E. A. HALVOSA, *Assistant Examiner.*